H. C. LOCKE.
SEED-PLANTER.
No. 7,062. Reissued April 18, 1876.
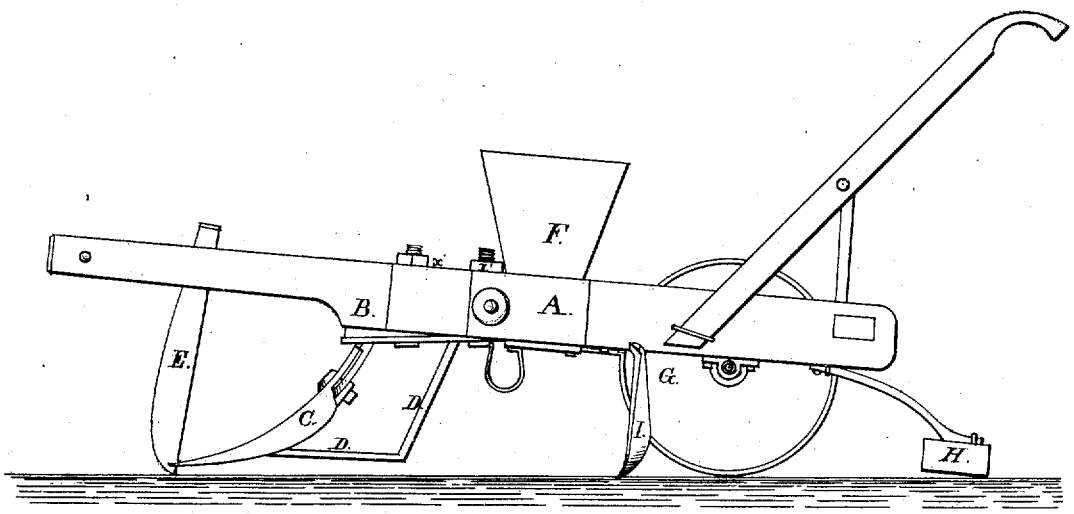
H. C. Locke
INVENTOR.
WITNESSES:
M. Gardner.
Edw. W. Dorn
F. B. Hunt & Co
ATTORNEY.
N. PETERS, PHOTO-LITHOGRAPHER, WASHINGTON, D. C.

UNITED STATES PATENT OFFICE.

H. C. LOCKE, OF SOMERVILLE, TENNESSEE, ASSIGNOR TO F. B. HUNT & CO.

IMPROVEMENT IN SEED-PLANTERS.

Specification forming part of Letters Patent No. 95,121, dated September 21, 1869; reissue No. 7,062, dated April 18, 1876; application filed March 22, 1876.

*To all whom it may concern:*

Be it known that I, H. C. LOCKE, of Somerville, in the county of Fayette and State of Tennessee, have invented a new and useful Improvement in Seed or Corn Planters; and I do hereby declare the following to be a full, clear, and exact description of the same, reference being had to the accompanying drawing, which represents a side elevation of my seed-planter.

My invention consists of an improved seed-planter, arranged and constructed in such a manner that the entire process of planting corn, or other seeds similarly planted, is effectually performed.

The construction of a portion of my seed-planter, relating to the operation of the seed-drop, by means of mechanism attached to the wheel G, the arrangement of the frame A, with wheel G and drag H attached thereto, and the position of the hopper F, I have described in my Letters Patent No. 77,057, dated April 21, 1868. The construction of the remaining parts to be described being the shape of the colter E, and its position with regard to the shovel C, and the attachment of the standard D to the beam B, by which means the shovel C, attached to said standard, is gaged either deep or shallow; and, third, the position of the teeth or shovels I with regard to the hopper.

That others may understand the construction and operation of my present improvements, I will give a full description of the same.

The colter E is formed with its cutting-edge coming under the toe of the shovel, as shown in the drawings, and secured to the beam by some suitable and sufficient means, the straight edge or back resting in a notch cut in the toe of the shovel. Thus it will be seen that the shovel or opener acts as a brace or stay to the colter by being placed in contact therewith to strengthen and support it when coming in contact with stones or other fixed objects.

The advantages of having the cutting-edge curved back instead of forward, as usual, are, first, the draft is lessened to some extent; and, second, when it comes in contact with roots too large to be severed, or large stones under the surface, it will not be necessary to stop and lift the apparatus over said obstacles, but, striking the curved edge of the colter, it will ride the plow or shovel over them, without the liability of breaking any of the parts.

The standard D, to which is fastened the shovel C by means of screw-bolts and nuts *b*, in order that it may be removed and replaced by a plow, is formed an open frame, as shown, the bottom of which forms a sole to run upon the bottom of a furrow, and it is attached to the beam B by screw-bolts and nuts *x x'*, by which means, in combination with the wedge L, the shovel attached to said standard may be gaged either deep or shallow.

L is a wedge, having a longitudinal slot cut therein, through which the screw-bolt *x* passes, thus permitting the wedge to slide longitudinally when the screw-bolts *x x'* are not tightened; the object of said wedge being to gage the shovel either deep or shallow by respectively sliding the wedge up farther between the standard and beam to gage the shovel deep, and sliding it in the contrary direction to produce a different effect. The screw-bolts are then tightened, and the shovel is ready gaged.

I are teeth, only one of which is shown, fastened to the frame A behind the hopper, as shown in the drawings, to throw the earth into the furrow after the seed has been dropped therein.

The combination of these separately-constructed parts works thus: The hopper being filled with corn, the team attached and put in motion, the colter and shovel prepare the furrow; the seed-drop, being put in motion by means of a knob attached to the side of the wheel, works a valve or seed-drop connected with the hopper, dropping the seed in equal quantities and at equal distances; the teeth or shovels, being placed behind the hopper in the position shown, throw the earth accumulated on each side of the furrow, in excavating the same, over the seed, after which the wheel compresses the ridge thus formed to make it more compact, and the drag following breaks and disposes of the clogs.

Having described my invention, what I claim as new is—

1. In a seed-planter, a colter, the front edge of which is curved or inclined backward, said colter resting in contact with the toe of the shovel or opener, said shovel acting as a stay or brace to the colter, substantially as described.

2. The colter E, the front edge of which is curved or inclined backward, said colter resting in contact with a shovel or opener in front of the seed-hopper, in combination with the teeth or coverers in rear of said hopper, substantially as set forth.

3. The colter E and shovel or opener, arranged in front of the seed-hopper, in combination with the teeth or coverers I, and wheel G in rear of said seed-hopper, substantially as and for the purpose set forth.

H. C. LOCKE.

Witnesses:
R. S. LOCKE,
W. T. LOCKE.